United States Patent [19]

Maestas

[11] Patent Number: 5,199,238
[45] Date of Patent: Apr. 6, 1993

[54] WALL REPAIR DEVICE

[76] Inventor: Luis L. Maestas, 785 N. 50 West, Midway, Utah 84049

[21] Appl. No.: 708,190

[22] Filed: May 31, 1991

[51] Int. Cl.⁵ ............................................. E02D 37/00
[52] U.S. Cl. ......................................................... 52/514
[58] Field of Search ................... 52/514, 509; 411/388

[56] References Cited

U.S. PATENT DOCUMENTS

| | | | |
|---|---|---|---|
| 3,325,955 | 6/1967 | Haut | 52/514 |
| 3,690,084 | 9/1972 | Leblanc | 52/514 |
| 4,297,823 | 11/1981 | Keisler | 52/514 |
| 4,848,056 | 7/1989 | Kelly | 52/514 |
| 4,945,700 | 8/1990 | Powell | 52/514 |

Primary Examiner—Richard E. Chilcot, Jr.
Attorney, Agent, or Firm—Mallinckrodt & Mallinckrodt

[57] ABSTRACT

A wall repair device is provided for aiding in the repair of a hole in a standard plasterboard wall. The device comprises a rigid mounting plate, a first hollow cylinder which forms a cavity, a second hollow cylinder disposed within the cavity of the first cylinder so as to be in telescoping relationship thereto, and an advancing structure for selectively drawing the second cylinder outwardly through the top portion of the first cylinder to a locked, extended position such that the device becomes self-supporting within the interior of the wall to be repaired, the mounting plate substantially covering a hole therein. A layer of plaster is then applied to fill the remainder of the hole, the mounting plate serving as a foundation for the plaster.

16 Claims, 5 Drawing Sheets

WALL REPAIR DEVICE

BACKGROUND OF THE INVENTION

1. Field

This invention relates generally to the field of cosmetic repair to buildings and the like, and more specifically to a novel device for covering a hole in a wall, the device serving as a foundation in plastering over the hole.

2. Prior Art

In modern times, the vast majority of interior walls are formed by first erecting a series of two by four studs in parallel relation into a vertical lattice. Plasterboard, fiberboard, or a similar sheet like material is then nailed, screwed or otherwise fastened to the studs to complete the wall structure. Plastering, sanding and painting then make the wall structure more acceptable and aesthetically pleasing to the eye.

This method of erecting walls is a substantial time saver, as well as money saver, over the previously used plaster walls which were comparatively difficult and uneconomical to build. While plasterboard walls are easier to build and less expensive than plaster walls, however, a difficulty exists because plasterboard walls are not as durable or as structurally sound as the predecessor plaster walls. For example, it is common place to accidentally open a door with too much force, the doorknob of the door or a hook or similar protrusion attached to the door breaking a hole into the plasterboard between the supporting studs.

While small holes in plasterboard, such as those formed by nails, tacks, and the like, are easily repaired, larger holes, such as those formed by doorknobs, are much more difficult to patch. Because plasterboard walls generally have a substantially hollow interior, there is no support or foundation to hold the plaster with which the repair is to be made. Consequently, a number of devices have been used in the prior art to assume the position of a foundation. Each of these devices has proved to have a number of disadvantages.

One of the prior art devices consists of a nonadhesive, paper like tape, which is stretched over the hole to be repaired, the ends thereof being wetted to form a weak bond with the wall to hold the tape in place. While many manufacturers produce a tape similar to that described, these tapes are usually collectively known as perfatape. Although generally serving as an adequate foundation for holes no bigger than a few inches in diameter, perfatape does not provide the structural integrity necessary to hold enough plaster required to repair a larger hole.

Wire mesh screens are also known and used in the art, although such have proven to have unacceptable disadvantages as well. While wire mesh screens generally provide adequate structural strength, such screens are difficult to position in place within the hole to be repaired, and thus may slide about or even fall out of the hole as the plaster is applied thereto. Furthermore, plaster can seep and ooze through the screen elements, thereby wasting significant amounts of plaster. Thus, the use of wire screens can be disadvantageous in the repair of holes in plasterboard walls.

It is believed that one skilled in the art will appreciate that there is currently no device known within the art which is facilely inserted into the hole to be repaired and anchored therein so as to serve as a sure foundation for the plaster needed to repair the hole in the plasterboard itself. A legitimate need exists, therefore, in which an inexpensive foundation can be securely anchored within the interior of a plasterboard wall such that the hole to be repaired is covered by the foundation, the foundation then being covered over by plaster to an acceptable thickness.

BRIEF OBJECTS AND SUMMARY OF THE INVENTION

Accordingly, it is a principal object of the present invention to provide a device and related method for covering a hole in a plasterboard or similar wall to be repaired.

Another significant object of the present invention is to provide an inexpensive foundation for plaster which can be inserted through a hole to be repaired in a plasterboard wall.

A further significant object of the present invention is the provision of a foundation plate which is insertable through a hole in a plasterboard wall and which includes a structure for anchoring the foundation plate against the hole to be repaired by contacting the two outer sheets of the wall which are connected to opposing side faces of each of a series of structural studs.

A still further important object of the invention is to provide two telescoping members secured together by an electrical tie, the telescoping members selectively advancing to an extended position upon actuation of the electrical tie by pulling thereon.

Still another important object of the invention is to provide a wall repair device, and related method, which is easy to use, inexpensive, structurally sound, durable, uses relatively few components, and is formed of readily available materials.

These and other objects of the invention are realized in a preferred embodiment of the present invention described and illustrated herein. The device of the present invention comprises generally a rigid mounting plate; a first hollow cylinder which forms a cavity; a second hollow cylinder disposed within the cavity of the first cylinder so as to be in telescoping relationship to the first cylinder; and an advancing structure for selectively drawing the second cylinder outwardly through the top portion of the first cylinder to an extended position, such that the top portion of the second cylinder contacts the interior face of one of the two outer sheets of a standard plasterboard wall and the bottom portion of the first cylinder contacts the top face of the mounting plate, the bottom face of the mounting plate contacting the interior face of the other of the two outer sheets of the plasterboard wall to substantially cover a hole therein. At present preference, the bottom portion of the first hollow cylinder is hingedly connected to the top face of the mounting plate such that the first cylinder is brought into a position normal to the mounting plate while the second cylinder is drawn outwardly by the advancing structure.

Also, it is presently preferred that the advancing structure include a locking structure for maintaining the second cylinder in the extended position relative to the first cylinder after being drawn outwardly. Advantageously, the advancing structure includes a pair of oppositely disposed longitudinal channels in the second hollow cylinder, each channel having a length less than the length of the second hollow cylinder; a first peg disposed transversely in the cavity of the first cylinder in the top portion thereof such that the first peg is slidably received into the channels of the second cylinder; a second peg disposed transversely in the cavity of the second cylinder in the bottom portion thereof near the channels; and an electrical tie looped about both the first and second pegs such that a tensile force on the free end thereof causes a tightening of the loop which forces the first and second pegs together, which in turn forces the first and second cylinders into the extended position.

In use, the mounting plate and related advancing structure are inserted through the hole in the wall to be repaired. This may require the cutting of slots in one or both sides of the hole through which the mounting plate can be inserted. The mounting plate is maneuvered to at least substantially cover the hole to be repaired as the operator grasps the free end of the looped tie upon which the tensile force is to be applied. In this position, the tensile force is applied by pulling the free end of the looped tie, thereby causing the telescoping members to advance to the extended position, and thus anchoring the plate in position against the interior faces of the outer sheets of the plasterboard wall in which the hole to be repaired is located. At this point, a layer of plaster is applied to the mounting plate, the layer of plaster having an approximate thickness of one of the outer sheets, in a manner which is well known in the art.

BRIEF DESCRIPTION OF THE DRAWINGS

In order that the manner in which the above recited and other advantages and objects of the invention are obtained can be appreciated, a more specific description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanied drawings in which.

DETAILED DESCRIPTION OF THE PREFERRED EMBODIMENT

Reference is now made to the drawings in which like components are designated with like reference numbers throughout.

Figure 1:
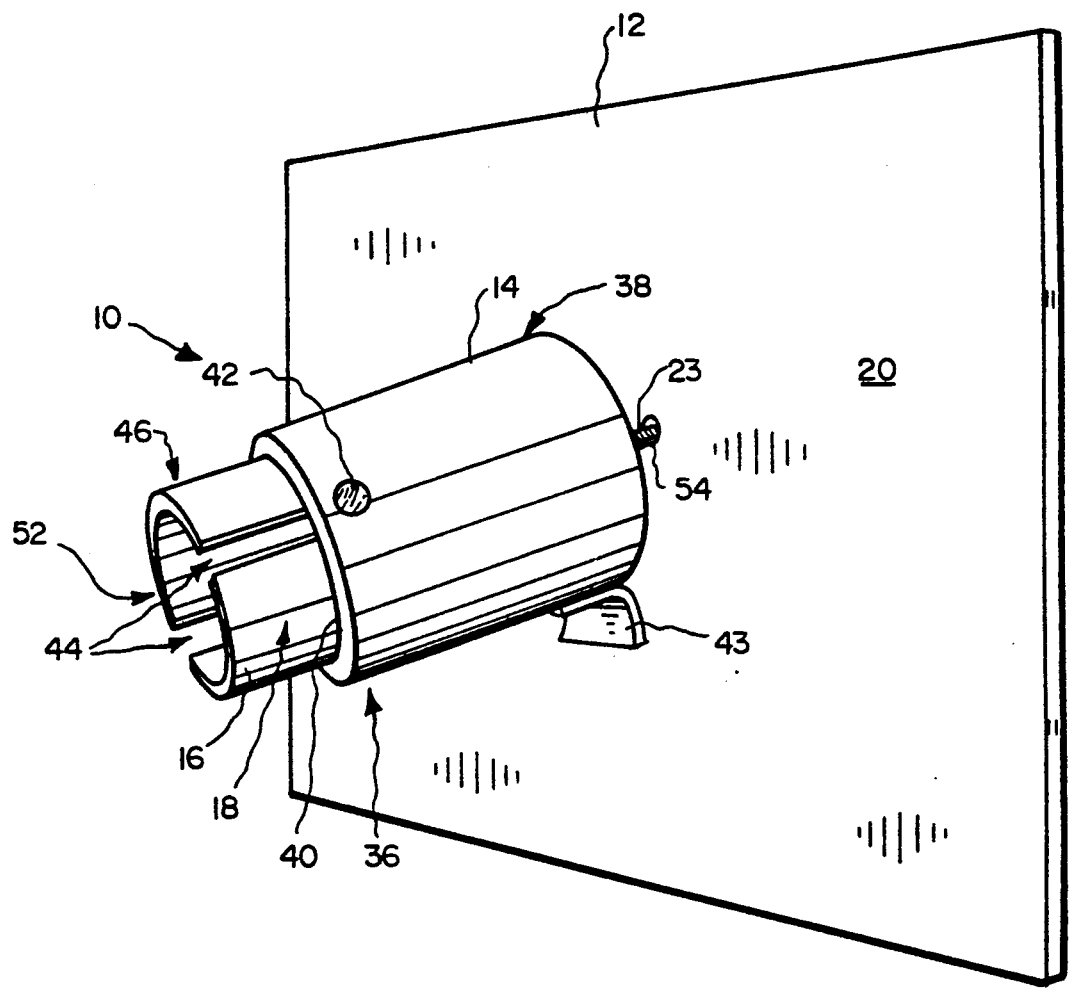
FIG. 1 is a front perspective view of a presently preferred embodiment of the present invention shown in a position where the telescoping members are advancing to an extended position.

Referring first to FIG. 1, a presently preferred embodiment of the present invention is illustrated. The device of the present invention, generally designated 10, comprises a rigid mounting plate 12, a first hollow cylinder 14, a second hollow cylinder 16 disposed within the first cylinder 14 so as to be in telescoping relationship thereto, and an advancing structure 18 for selectively drawing the second cylinder 16 outwardly through the first cylinder 14 such that the second cylinder 16 contacts one of two outer sheets 24 of a wall 26 to be repaired, the plasterboard wall comprising the two outer sheets 24 connected to opposing side faces 30 of each of a series of studs 28, the first cylinder 14 contacting the mounting plate 12, which also contacts the other of the two outer sheets 24 to substantially cover a hole 34 therein. Each of these components will be described hereafter in greater detail.

The rigid mounting plate 12 may be composed of virtually any well-known structural material. At present preference, a section of masonite board is used, however, one who is skilled in the art will recognize that a number of alternatives may be substituted therefore. For example, the rigid mounting plate 12 may be composed of fiber board, particle board, press board, or plywood.

Figure 2A:
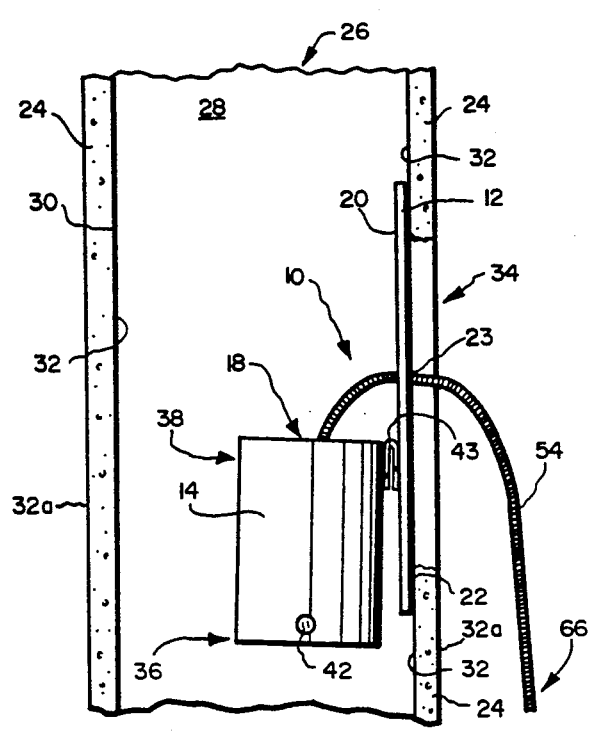
FIG. 2(a) is a side elevational view of the invention of FIG. 1 shown positioned against a wall to be repaired and prior to actuation of the advancing structure.
Figure 2B:
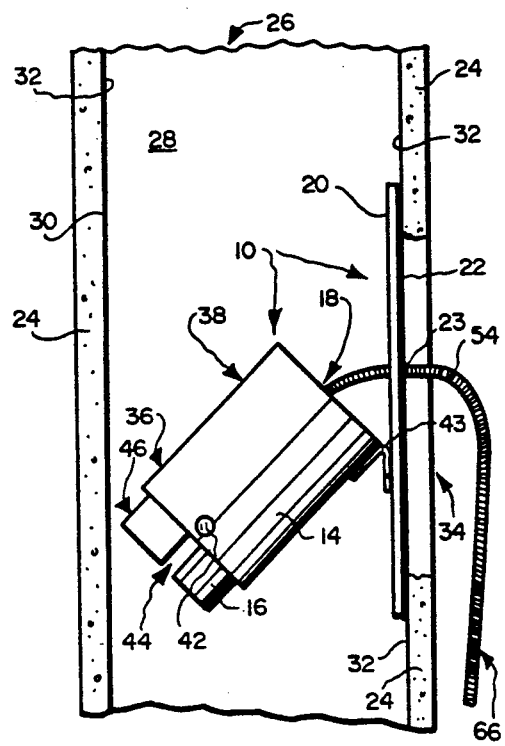
FIG. 2(b) is a side elevational view similar to FIG. 2(a), except illustrating the telescoping members as they are advanced to an extended position.
Figure 2C:
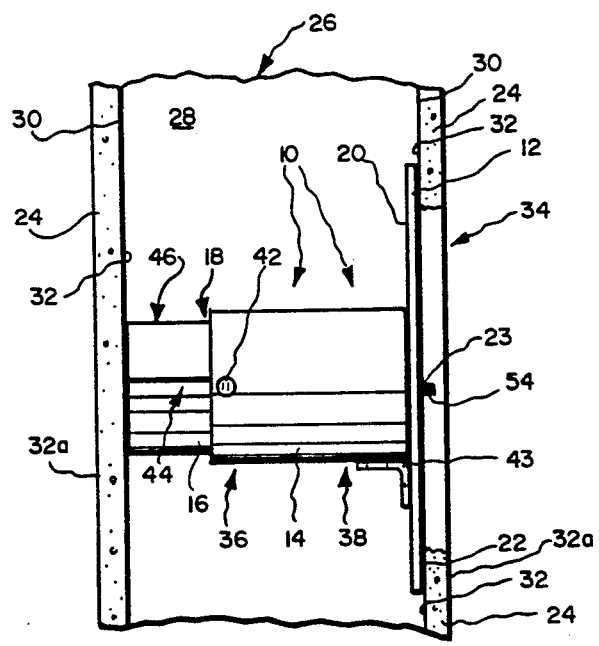
FIG. 2(c) is a side elevational view similar to FIGS. 2(a) and 2(b) shown in the extended position wherein both outer sheets of a typical plasterboard wall are contacted by the device to anchor the device in place.

As shown, the rigid mounting plate 12 has a top face 20 and a bottom face 22 and includes an aperture 23 drilled or otherwise formed through the approximate center thereof. The top face 20 of rigid mounting plate 12 contacts the first hollow cylinder 14, as will be explained hereafter. The bottom face 22 of the rigid mounting plate 12, in use, contacts one of the outer sheets 24 of the plasterboard wall 26, as best seen in FIG. 2(a)-2(c).

The plasterboard wall 26, as mentioned, comprises a series of studs 28, which generally are standard two-by-four timbers aligned vertically in parallel relationship to each other. Each stud 28 includes two side faces 30 to which the outer faces 24 are securely attached, as with nails, screws or the like. Referring now to FIG. 2(c), the bottom face 22 of the rigid mounting plate 12 is secured against the interior face 32 of the outer sheet 24 in which the hole 34 to be repaired is located.

The first hollow cylinder 14 may be constructed of any durable, lightweight, structural material. Advantageously, the first hollow cylinder 14 is constructed of a standard polyvinyl chloride (PVC) pipe which is cut to an appropriate length. As shown, the first hollow cylinder 14 has a top portion 36 and a bottom portion 38, the hollowed interior portion of the first hollow cylinder 14 forming a cavity 40.

Figure 4:
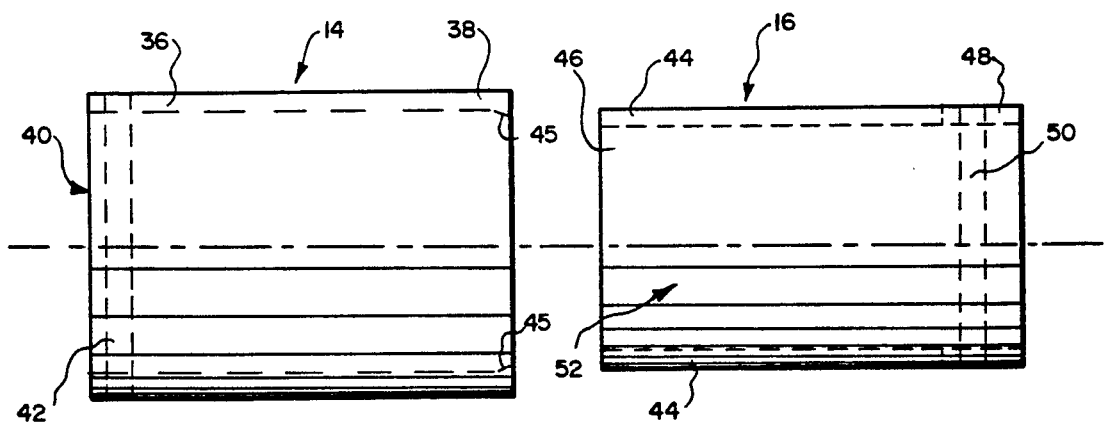
FIG. 4 is a side elevational view of the telescoping members.
Figure 5:
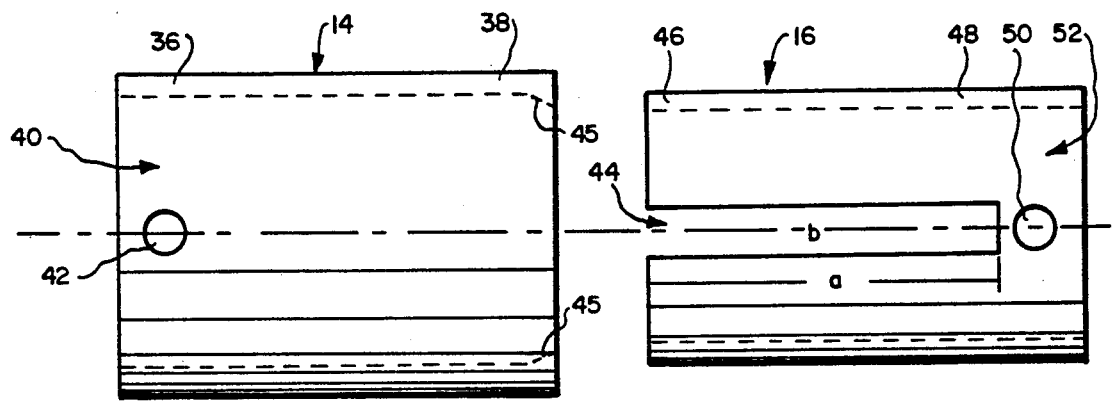
FIG. 5 is a top plan view of the telescoping members of FIG. 4.
Figure 6A:
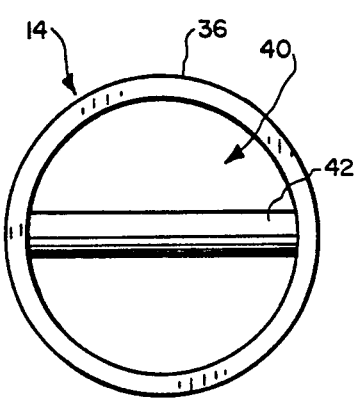
FIG. 6(a), an end elevation of the outer telescoping member of FIG. 5 looking from the left of FIG. 5.
Figure 6B:
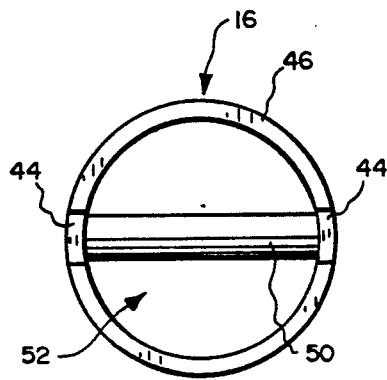
FIG. 6(b), an end elevation of the inner telescoping member of FIG. 5 looking from the left of the inner member in FIG. 5.

As best seen in FIGS. 4-6, the first hollow cylinder 14 includes a peg 42 disposed transversely in the cavity 40 in the top portion 46 thereof. The ends of the peg 42 are securely attached to the walls of the first hollow cylinder 14, as shown. Advantageously, the bottom portion 38 of the first hollow cylinder 14 has beveled inside edges 45 in order to frictionally hold the second hollow cylinder 16 therein without other means. See FIGS. 4 and 5.

Figure 9:
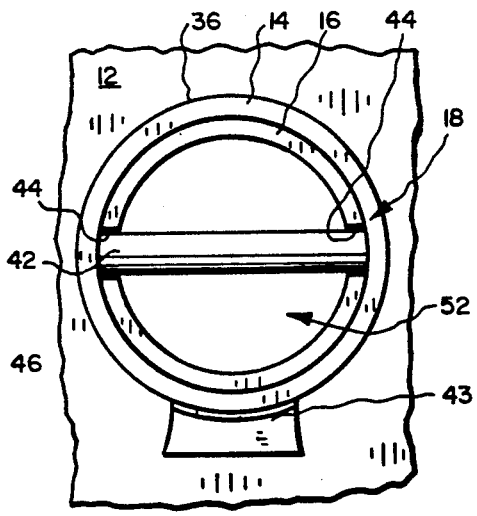
FIG. 9 is a cutaway view of the invention illustrating the hinge by which the telescoping members are attached to the mounting plate.

In the preferred embodiment of the present invention, the bottom portion 38 of the first hollow cylinder 14 includes a molded plastic hinge 41, or similar, for hingedly connecting the first hollow cylinder 14 to the top face 20 of the mounting plate 12. See FIGS. 1 and 9. The hinge 41 allows the first hollow cylinder 14 to be brought into a position normal to the mounting plate 12 while the second hollow cylinder 16 is drawn outwardly by the advancing structure 18. Alternatively, the bottom portion 38 of the first hollow cylinder 14 may be rigidly attached to the top face 20 of the mounting plate 12.

The second hollow cylinder 16 is constructed of a material similar or identical to that forming the first hollow cylinder 14. The outside diameter of the second hollow cylinder 16 is slightly less than the inside diameter of the first hollow cylinder 14, and thus the second hollow cylinder 16 may easily fit within the cavity 40 of the first hollow cylinder 14 in telescoping relationship. The beveled inside edges 45 in the bottom portion 38 if the first hollow cylinder 14 decrease the inside diameter thereof such that the first hollow cylinder 14 and second hollow cylinder 16 frictionally grip each other and thereby remain together unless influenced by an exterior force.

As best seen in FIG. 5, the second hollow cylinder 16 includes a pair of oppositely disposed, longitudinal channels 44, each channel 44 having a length a, which, as shown, extends from a top portion 46 into a bottom portion 48 of the second hollow cylinder 16. The length a of each channel 44 is less than the length of the second hollow cylinder 16. The channels 44 each have a width b, which is slightly greater than the diameter of the peg 42 disposed in the top portion 46 of the first hollow cylinder 14. Thus, the peg 42 in the top portion 46 of the first hollow cylinder 14 may be slidably received into the channels 44 of the second hollow cylinder 16.

The second hollow cylinder 16 further comprises a peg 50 which is similar in all respects to the peg 42 in the first hollow cylinder 14. As illustrated, the peg 50 is disposed transversely in the cavity 52 formed by the hollowed interior portion of the second hollow cylinder 16 in the bottom portion 48 thereof near the channels 44.

Figure 7A:
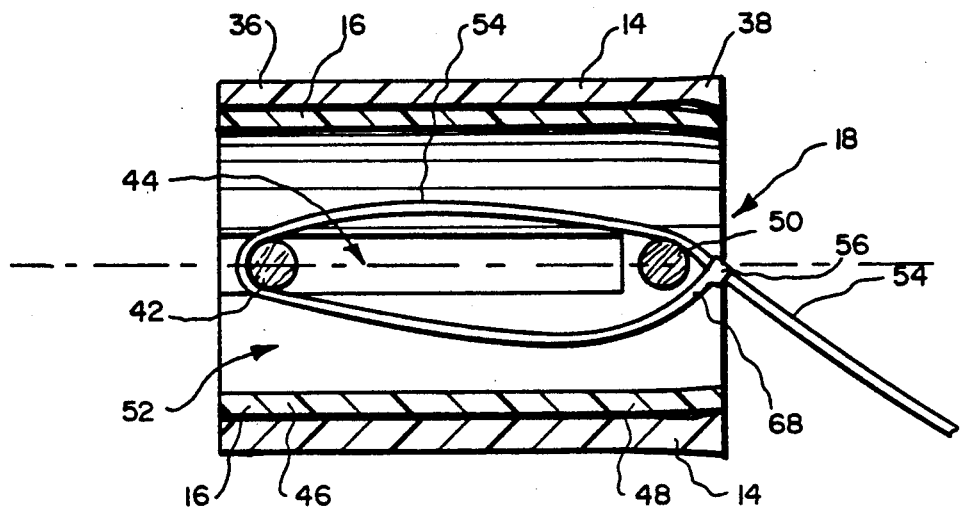
FIG. 7(a) is a cross-sectional side elevational view of the invention of FIG. 1 illustrating the structure for advancing the telescoping members in a position prior to actuation thereof.
Figure 7B:
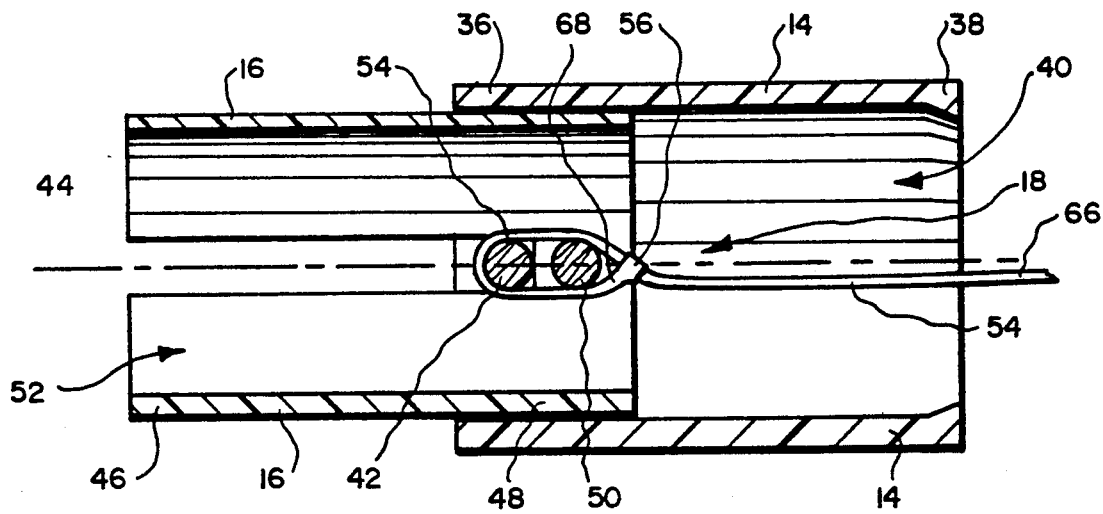
FIG. 7(b) is a cross-sectional side elevational view similar to FIG. 7(a) except showing the structure for advancing the telescoping members in the actuated, extended position.

Advantageously, the peg 50 has a longitudinal axis which is parallel to a transverse axis intersecting both channels 44. Thus, when the second hollow cylinder 16 is placed within the first hollow cylinder 14 in telescoping relationship thereto, the pegs 42 and 50 are parallel to each other, the peg 42 being engaged by the channels 44 such that the second hollow cylinder 16 cannot be drawn completely out of the first hollow cylinder 14, as best illustrated in FIGS. 7(a) and 7(b).

The advancing structure 18 comprises the peg 42 in the first hollow cylinder 14 and the peg 50 in the second hollow cylinder 16. Further, the advancing structure 18 comprises an electrical tie 54 which is looped about both the peg 42 and the peg 50 such that a tensile force on the first, or free, end 66 of the electrical tie 54 causes a tightening of the loop which forces the peg 42 and the peg 50 together. This action is best illustrated in FIGS. 7(a) and 7(b) in combination.

The electrical tie 54 is well known in the art and is commonly used to attach electrical wires or cables to a supporting structure. One skilled in the art will recognize, however, that alterative devices may be used without departing from the scope of the invention. The preferred electrical tie 54 is best illustrated in FIGS. 8(a) and 8(b).

The electrical tie 54 is self locking and includes a single direction head 56 and a channel 58 which includes a series of transversely disposed slots 60. Within the head 56 is a tab 62 which includes a nipple 64 for engaging the slots 60 in the channel 58.

Figure 8A:
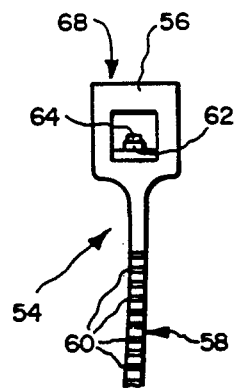
FIG. 8(a) is a side elevational view of the head and channel portions of the electrical tie.
Figure 8B:
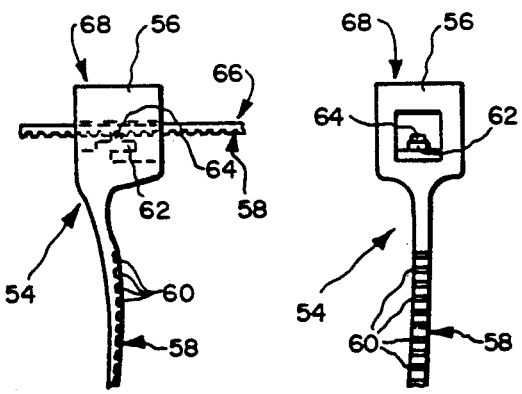
FIG. 8(b) is a front elevational view of the electrical tie of FIG. 8(a)

As illustrated in FIG. 8(a), the tab 62 is disposed so as to allow movement of the first end 66 of the electrical tie 54 which has been looped about to be inserted into the second end 68, which includes the head 56. As shown, the tab 62 will move downwardly out of the way of the slots 60 in the channel 58 as the first end 66 is pulled through the head 56 in a direction which decreases the size of the loop. In contrast, if the first end 66 is pulled in a direction which increases the size of the loop, the tab 62 will not move and the nipple 64 will remain engaged in one of the slots 60. This configuration allows for limitation of movement of the first end 66 through the second end 68 to a single direction, and is in this manner self-locking. Thus, when a tensile force has been applied to the first end 66 of electrical tie 54 such that the pegs 42 and 50 are brought closer together, the pegs 42 and 50 will remain in this position. In this manner, the telescoping first and second hollow cylinders 14 and 16, respectively, in conjunction with the mounting plate 12, abut against the interior faces 32 of the two outer sheets 24 of the plasterboard wall 26 to anchor the mounting plate 12 in position over a hole 34.

Figure 3:
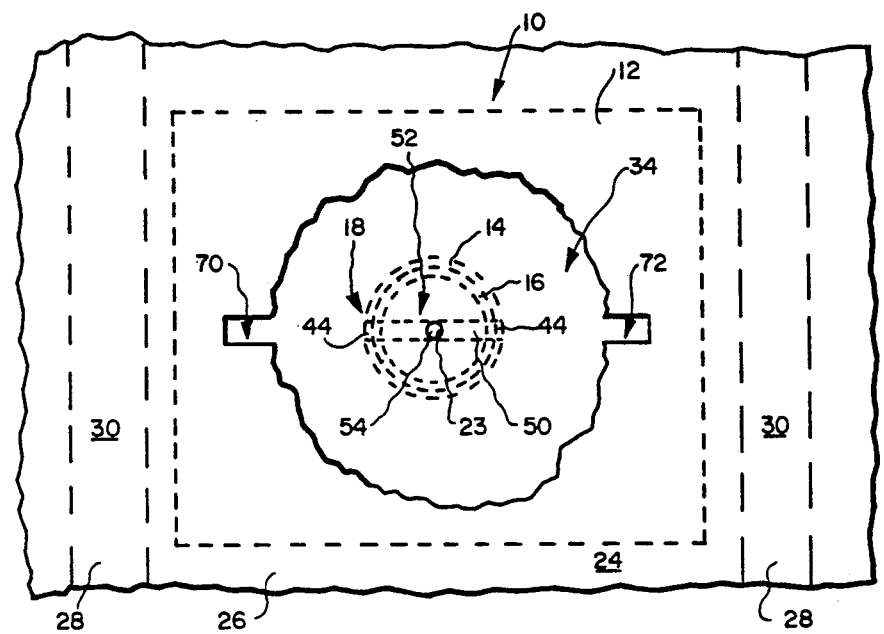
FIG. 3 is a front elevational view of the present invention in the extended position and prepared to receive plaster.

The present invention is best carried out in the following manner. First, the device 10, including the first and second hollow cylinders 14 and 16, respectively, and the advancing structure 18, is inserted through the hole 34 to be repaired. This may require enlarging the hole 34 by cutting two slots 70 and 72 in opposing sides therein. See FIG. 3.

The device 10 is then maneuvered into the position shown in FIG. 2(a), wherein the bottom face 22 of the mounting plate 12 is flush against the interior face 32 of the outer sheet 24 in which the hole 34 is located, thereby substantially covering the hole 34. The user may advantageously grip the free end 66 of the electrical tie 54, which protrudes through the aperture 23 in the mounting plate 12, to hold the device 10 while guiding the device 10 into position with his or her fingers.

Once the device 10 is properly positioned over the hole 34, a tensile force is exerted on the free end 66 of the electrical tie 54 to actuate the advancing structure 18. Responsive thereto, the action illustrated in FIGS. 2(a)-2(c) occurs. Namely, the hollow cylinders 14 and 16 are brought into a position normal to the mounting plate 12, while at the same time telescoping outwardly into a locked extended position such that the top portion 46 of the second hollow cylinder 16 contacts one of the outer sheets 24 and the bottom portion 38 of the first hollow cylinder 14 contacts the top face 20 of the mounting plate 12, the bottom face 22 of the mounting plate 12 contacting the other of the two outer sheets 24.

Because the advancing structure 18 is self-locking, as explained, the telescoping hollow cylinders 14 and 16 are self-supporting and thus remain anchored in this position. At this point, the free end 66 of the electrical tie 54 is cut off near where it protrudes through the aperture 23 in the mounting plate 12. A standard plaster material (now shown) is then prepared and applied to the bottom face 22 of the mounting plate 12 in a manner which is well known in the art. This plaster material should completely fill the remainder of the hole 34 which is not covered by the mounting plate 12, the mounting plate 12 serving as a foundation for the plaster material.

The present invention may be embodied in other specific forms without departing from its essential characteristics. The described embodiment is to be considered in all respects only as illustrative and not as restrictive. The scope of the invention is, therefore, indicated by the appended claims rather than by the foregoing description. All changes which come within the meaning and range of the equivalence of the claims are to be embraced within their scope.

I claim:

1. A device to aid in the repair of a hole in a wall in which two outer sheets are connected to opposing side faces of each of a series of studs, said device comprising:
   a rigid mounting plate having top and bottom faces,
   a first hollow cylinder having top and bottom portions and forming a cavity,
   a second hollow cylinder disposed within the cavity of the first cylinder so as to be in telescoping relationship to the first cylinder, the second cylinder having top and bottom portions,
   advancing means for selectively drawing the second cylinder outwardly through the top portion of the first cylinder to an extended position, and
   means hingedly connecting the bottom portion of the first hollow cylinder to the top face of the mounting plate such that the first cylinder is brought into a position normal to the mounting plate while the second cylinder is drawn outwardly by the advancing means,
   such that the top portion of the second cylinder contacts one of the two outer sheets and the bottom portion of the first cylinder contacts the top face of the mounting plate, the bottom face of the mounting plate contacting the other of the two outer sheets to substantially cover a hole therein.

2. A device according to claim 1 wherein the bottom portion of the first hollow cylinder is hingedly connected to the top face of the mounting plate such that the first cylinder is brought into a position normal to the mounting plate while the second cylinder is drawn outwardly by the advancing means.

3. A device according to claim 1 wherein the advancing means includes locking means for maintaining the second cylinder in the extended position relative to the first cylinder after being drawn outwardly.

4. A device according to claim 3 wherein the locking means comprises a self-locking electrical tie which includes a single direction head and a channel with transversely disposed slots, the channel being inserted through the head such that the transversely disposed slots are engaged by the head to limit movement of the channel therethrough to a single direction.

5. A device according to claim 1 wherein the second hollow cylinder also forms a cavity and includes a pair of oppositely disposed longitudinal channels, each channel having a length less than the length of the second hollow cylinder, and wherein the advancing means comprises
   a first peg disposed transversely in the cavity of the first cylinder in the top portion thereof such that the first peg is slidably received into the channels of the second cylinder,
   a second peg disposed transversely in the cavity of the second cylinder in the bottom portion thereof near the channels, and
   a tie having first and second ends, the tie being looped about both the first and second pegs such that a tensile force on the first end causes a tightening of the loop which forces the first and second pegs together.

6. A device according to claim 5 wherein the mounting plate includes an aperture through which the first end of the tie is inserted such that a tensile force can be delivered to the first end of the tie by an operator positioned near the exterior of the wall.

7. A device to aid in the repair of a hole in a wall in which two outer sheets are connected to opposing side faces of each of a series of studs, said device comprising:
   a rigid mounting plate having top and bottom faces,
   a first hollow cylinder having top and bottom portions and forming a cavity,
   a second hollow cylinder disposed within the cavity of the first cylinder so as to be in telescoping relationship to the first cylinder, the second cylinder having top and bottom portions and forming a cavity, and including a pair of oppositely disposed longitudinal channels, each channel having a length less than the length of the second hollow cylinder,
   a first peg disposed transversely in the cavity of the first cylinder in the top portion thereof such that the first peg is slidably received in the channels of the second cylinder,
   a second peg disposed transversely in the cavity of the second cylinder in the bottom portion thereof near the channels, and
   a tie having first and second ends, the tie being looped about both the first and second pegs such that a tensile force on the first end causes a tightening of the loop which forces the first and second pegs together,
   such that the top portion of the second cylinder contacts one of the two outer sheets and the bottom portion of the first cylinder contacts the top face of the mounting plate, the bottom face of the mounting plate contacting the other of the two outer sheets to substantially cover a hole therein.

8. A device to aid in the repair of a hole in a wall in which two outer sheets are connected to opposing side faces of each of a series of studs, said device comprising:
   a rigid mounting plate having top and bottom faces,
   a first hollow cylinder having top and bottom portions and forming a cavity,
   a second hollow cylinder disposed within the cavity of the first cylinder so as to be in telescoping relationship to the first cylinder, the second cylinder having top and bottom portions,
   advancing means for selectively drawing the second cylinder outwardly through the top portion of the first cylinder to an extended position,
   locking means for maintaining the second cylinder in extended position relative to the first cylinder after being drawn outwardly, such that the top portion of the second cylinder contacts one of the two outer sheets and the bottom portion of the first cylinder contacts the top face of the mounting plate, the bottom face of the mounting plate contacting the other of the two outer sheets to substantially cover a hole therein.

9. A device according to claim 8 wherein the second hollow cylinder also forms a cavity and includes a pair of oppositely disposed longitudinal channels, each channel having a length less than the length of the second hollow cylinder, and wherein the advancing means comprises:

a first peg disposed transversely in the cavity of the first cylinder in the top portion thereof such that the first peg is slidably received into the channels of the second cylinder, a second peg disposed transversely in the cavity of the second cylinder in the bottom portion thereof near the channels, and a tie having first and second ends, the tie being looped about both the first and second pegs such that a tensile force on the first end causes a tightening of the loop which forces the first and second pegs together.

10. A device according to claim 9 wherein the mounting plate includes an aperture through which the first end of the tie is inserted such that a tensile force can be delivered to the first end of the tie by an operator positioned near the exterior of the wall.

11. A device for placement over an opening in a wall wherein the wall with the opening has a front face and a rear face and wherein the rear face is spaced from and confronts a spaced, confronting surface, comprising:

a housing sized to pass through the opening;

abutting means cooperable with the housing for abutting the rear face of the wall when the device is in desired position over the opening to prevent the device from passing through the opening;

extension means cooperable with the housing for selective extension therefrom toward the confronting surface when the device is in desired position over the opening; and means operable by a force exerted in a direction away from the confronting surface for extending the extension means from the housing to contact the confronting surface and force the abutting means against the rear face of the wall to thereby securely hold the device in an installed position over the opening and between the confronting surface and the rear face of the wall.

12. A device according to claim 11, wherein the abutting means is a plate sized to substantially cover the opening when the device is in installed position over the opening to form a backing for repair material to be placed in the opening.

13. A device according to claim 12, wherein the housing is hingedly secured to the abutting means whereby the housing assumes a folded position in relation to the abutting means when the device is to be inserted through the opening in the wall from the front face, and an unfolded position after insertion of the device through the opening when the device is to be installed in position over the opening and between the confronting surface and the rear face of the wall.

14. A device according to claim 13, wherein the extension means is telescopicly received by the housing and is extendable therefrom.

15. A device according to claim 14, wherein the means for extending the extension means includes housing peg means secured to the housing, extension means peg means secured to the extension means, the housing peg means and the extension means peg means being located with respect to one another so that the respective peg means move toward one another as the extension means is extended from the housing, and means for moving the respective peg means toward one another when it is desired to extend the extension means.

16. A device according to claim 15, wherein the means for moving the respective peg means toward one another is a manually closable loop of flexible material looped about the respective peg means whereby when the loop is closed, the respective peg means are drawn closer together thereby extending the extension means from the housing.

* * * * *